(No Model.) 2 Sheets—Sheet 2.
J. J. SULLIVAN.
DEVICE FOR STARTING RACE HORSES.
No. 481,835. Patented Aug. 30, 1892.
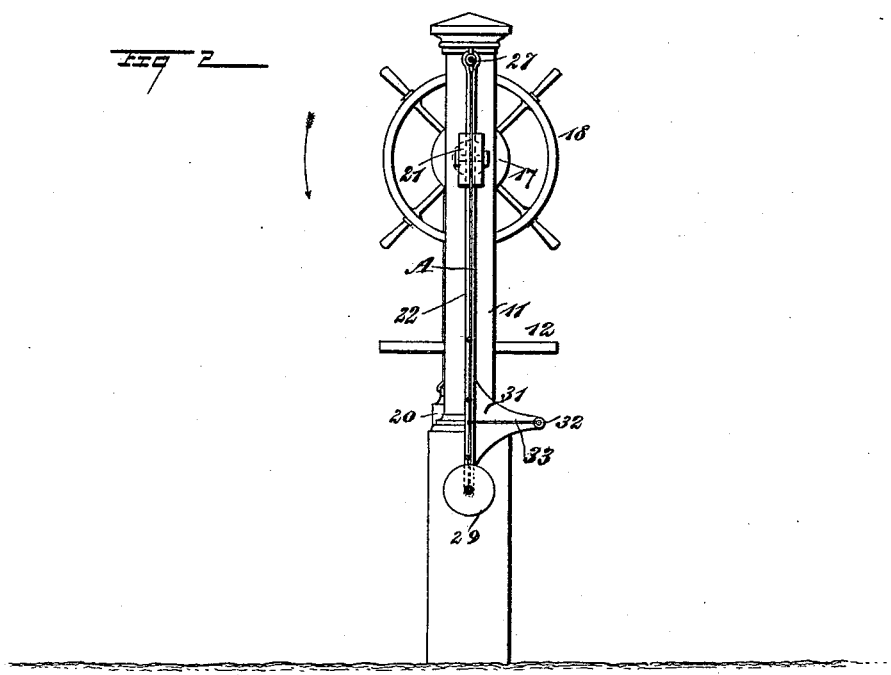
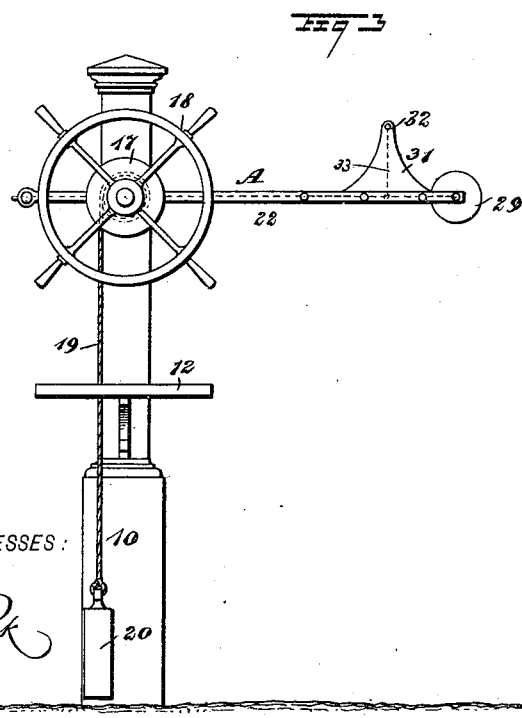
WITNESSES:
H. Walker
C. Sedgwick
INVENTOR:
J. J. Sullivan
BY Munn & Co.
ATTORNEYS

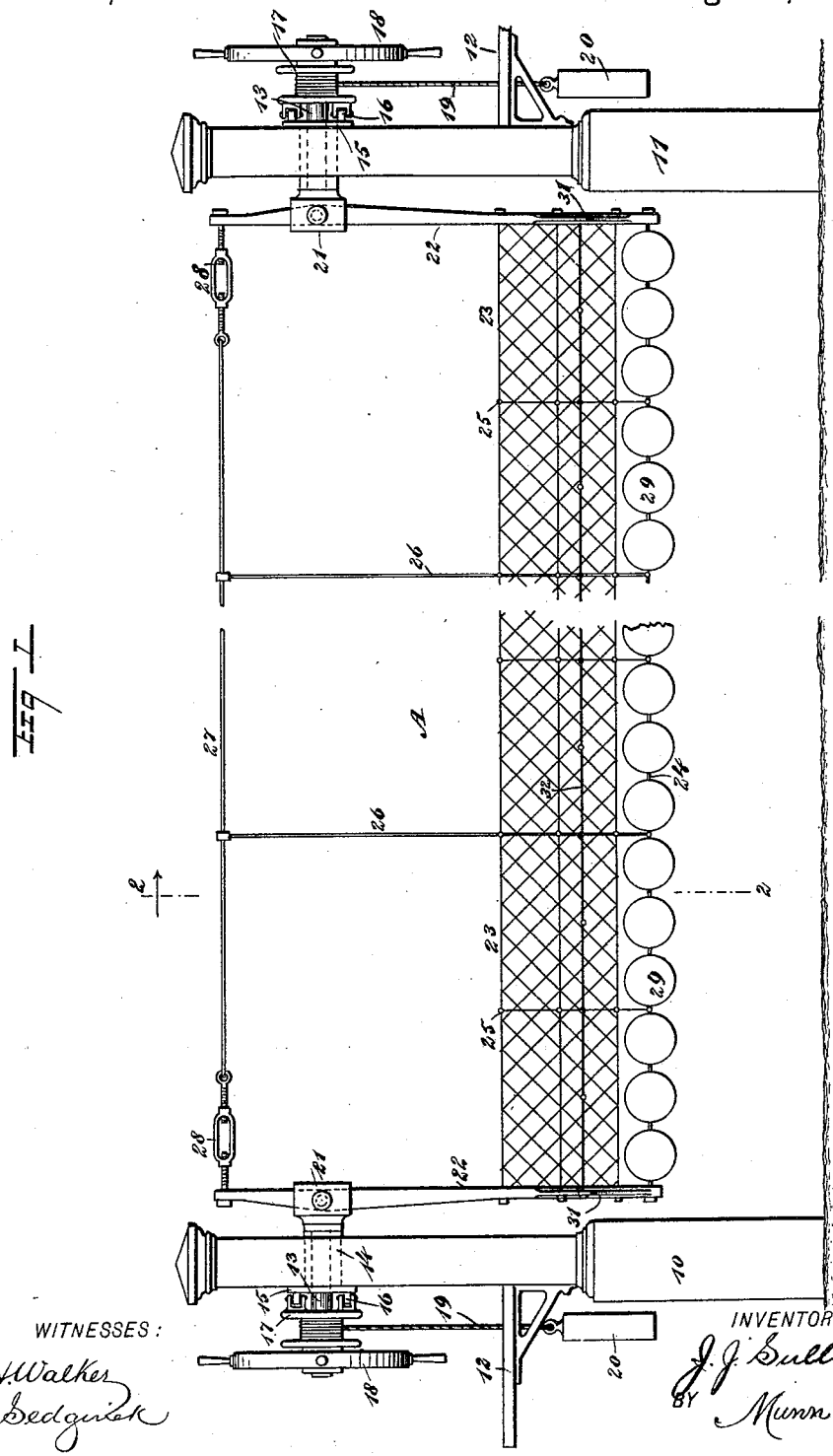

UNITED STATES PATENT OFFICE.

JAMES J. SULLIVAN, OF NEW YORK, N. Y.

DEVICE FOR STARTING RACE-HORSES.

SPECIFICATION forming part of Letters Patent No. 481,835, dated August 30, 1892.

Application filed December 18, 1891. Serial No. 415,512. (No model.)

*To all whom it may concern:*

Be it known that I, JAMES J. SULLIVAN, of New York city, in the county and State of New York, have invented a new and useful Device for Starting Race-Horses, of which the following is a full, clear and exact description.

My invention relates to a device for starting race-horses, and has for its object to provide a screen constructed in such a manner as to insure a fair and prompt start for the horses in a race by ranging the horses against the screen.

Another object of the invention is to provide a device which will not at all injure the horses nor frighten them, and which may be expeditiously and conveniently carried out of the path of the horses when it is intended that a start shall be made.
The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the device.
Fig. 2 is a vertical section taken, practically, on the line 2 2 of Fig. 1. Fig. 3 is an end view, the screen being in a horizontal position; and Fig. 4 is a sectional view taken through one of the cushions.
Two posts or standards 10 and 11 are placed in an upright position at any desired interval apart, the posts being in transverse alignment. Each post is preferably provided upon its outer side with a platform 12, and above the platform in each post a shaft 13 is journaled, the said shaft extending through and beyond opposite sides of the posts. The posts are provided with suitable bushings or bearings 14, in which the shafts 13 readily turn, and upon the outer face of each post a wear-plate 15 is located, adapted to receive friction-rollers 16, attached to one side of drums 17, a drum being secured upon each shaft, and upon the outer extremity of each shaft a hand-wheel 18 is attached in any suitable or approved manner, or any equivalent of the hand-wheel may be employed. The drums have coiled thereon ropes, cables, or chains 19, the free ends of which ropes, cables, or chains have weights 20 attached thereto. The inner end of each shaft 13 is provided with a socket 21, and in each socket the upper portion of a bar 22 is pivoted, the said bars being adapted to act as the side pieces of a screen A. The screen, in addition to the side pieces 22, comprises a single or a number of connected panels 23, of wire, cord, or other suitable material, the panels being formed, preferably, as lattice or open work. In the drawings one panel only is employed, the ends whereof are secured in any suitable or approved manner to the longer ends of the side bars 22, or what may be termed the "lower ends" of said arms.

Beneath the panel 23 a rod, cable, or wire 24 is located, which extends, also, from one side bar to the other. This rod, cable, or wire may be supported in any approved manner. Ordinarily, however, strands of wire 25 are secured to the panel or are attached to the rod or cable at various points in its length. The rod or cable and panel are also supported by upwardly-extending braces 26, which braces are located where required at proper intervals apart, and their upper ends are connected with an upper cable, rod, or wire 27, the said cable or rod being in its turn connected with the upper shorter ends of the side bars 22 by means of turnbuckles 28. By using the turnbuckles 28 the lower ends of the side bars 22 may be carried outward in direction of the posts or uprights 10 and 11 to stretch the panel 23 or inward or away therefrom to release the panel from tension, suitable means being employed to limit the movements of said side bars.

Upon the rod or cable 24 a series of cushions 29 is located. These cushions are made of any elastic material, rubber being preferred, and are shaped as a ball, as is best shown in Fig. 4, the said ball being provided with a passage 30, extending through from side to side, and through which the rod, bar, or cable 24 is passed, the balls being capable of revolving. As the screen is quite heavy, a certain amount of friction will exist between the panels 23 and their bearings. Therefore the friction-rollers 16 are employed to run against the wear-plates 15, and thereby remove some of the friction and enable the screen to be carried readily and rapidly from the horizontal to the vertical position, and vice versa. The cables 19 and weights 20 are adapted to hold the screen in a horizontal position; but when the screen is to be used it is brought to a vertical position through the manipulation of the hand-wheels. In order that the panel 23 may be properly supported when the screen is in its horizontal position, ears 31 are projected from each of the side bars 22 at their lower ends, and these ears are connected by a wire 32, the said wire being in turn connected with the panel at intervals in its length by means of wires 33 or the equivalents thereof.

In operation when the horses are called to the post the screen will be in the horizontal position, as shown in Fig. 3, about twelve feet above the ground, offering no obstacle to free passage on the track. When the horses are all at the post, the screen is turned down to the vertical position shown in Figs. 1 and 2, effectually barring the movement of the horses beyond it, the panel or netting 23 affording a perfect but harmless barrier. The line of horses is then formed behind the screen and the official starter gives the signal. When the proper signal is given for starting, the screen is instantly swung forward and upward by operators stationed upon the platforms 12 and manipulating the hand-wheels 18, and the screen in passing upward and forward is completely and safely removed from the path of the horses and a free passage is afforded them along the track, at which time the horses dash away. If the starter, who will be some distance beyond the screen, is satisfied with the grouping or alignment of the horses as they pass him, he will drop the flag in the usual manner. If not satisfied, he withholds the flag and the horses are brought back and are again aligned behind the screen for another trial. The cushions 29 are very effective in preventing the horses or the jockeys from injuring themselves by running against the screen.

Having thus described my invention, I claim as new and desire to secure by Letters Patent—

1. In a device for starting race-horses, a screen consisting of side pieces, network secured to the lower ends of the side pieces, cushions below the network, and a wire connecting the upper ends of the side pieces, substantially as described.

2. In a device for starting race-horses, the combination, with supports and shafts journaled therein, of a screen connected with the shafts and located between the supports, the said screen comprising a frame carrying cushioned panels, and a mechanism, substantially as described, for rotating the shafts, as and for the purpose set forth.

3. In a device for starting race-horses, a screen consisting of side pieces, network secured between the lower ends of the side pieces, a wire or rod connecting the upper ends of the said side pieces, a rod or wire secured to the lower ends of the side pieces below the network, cushions on the said rod or wire, and wires secured to the rod or wire carrying the cushions and to the network and the wire or rod between the upper end of the side pieces, substantially as described.

4. In a device for starting race-horses, the combination, with supports and shafts journaled in said supports and provided with hand-wheels, the shafts being provided at their inner ends with sockets, of a screen the side bars of which are pivoted in the sockets of the shafts, and a take-up device connecting the side bars of the screen, the lower portion of the screen consisting of cushioned panels, substantially as and for the purpose set forth.

5. In a device for starting race-horses, the combination, with supports, shafts journaled in said supports, provided at their inner ends with sockets and at their outer ends with rotating devices, drums secured upon the shafts, cables carried by the drums, and weights attached to the cables, of a screen the side bars of which are pivoted in the sockets of the shafts, the lower portion of the screen consisting of a network and the upper end being provided with a tension device or take-up whereby the screen may be tightened or stretched, all combined to operate substantially as and for the purpose specified.

JAMES J. SULLIVAN.

Witnesses:
J. FRED. ACKER,
C. SEDGWICK.